INVENTORS
DONALD J. WHEELER
VICTOR LOHRENZ
BY
Oberlin, Maky & Donnelly
ATTORNEYS

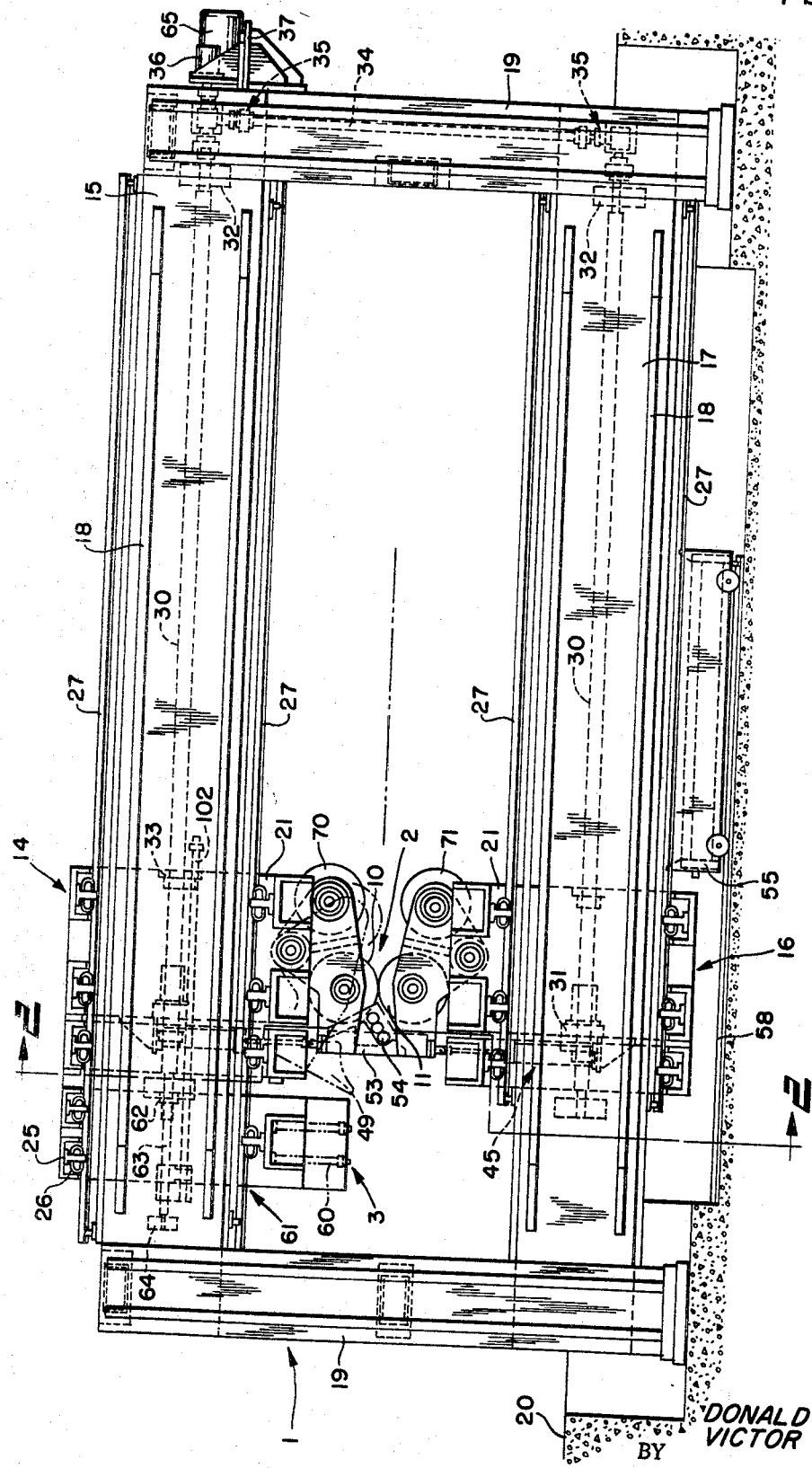

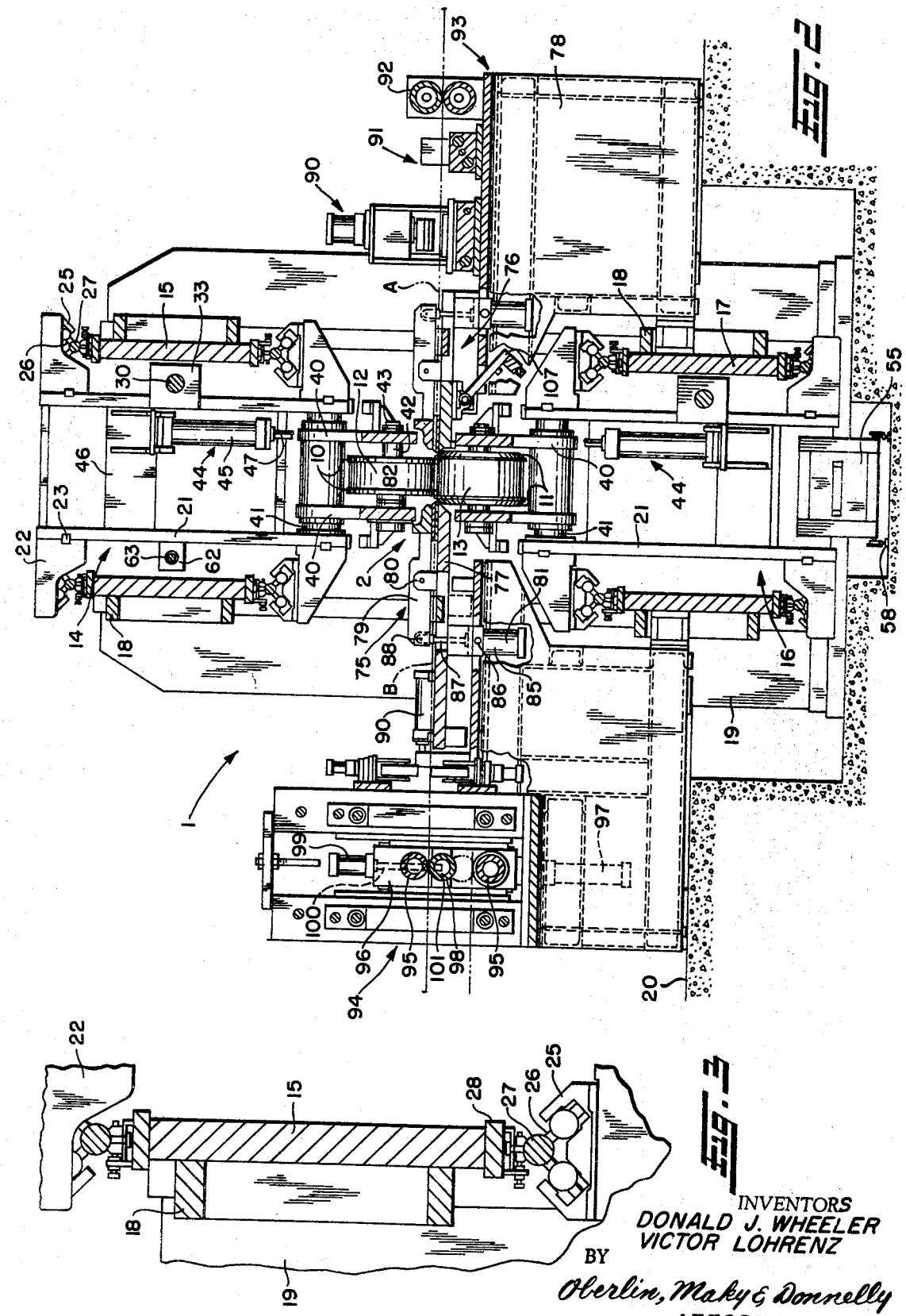

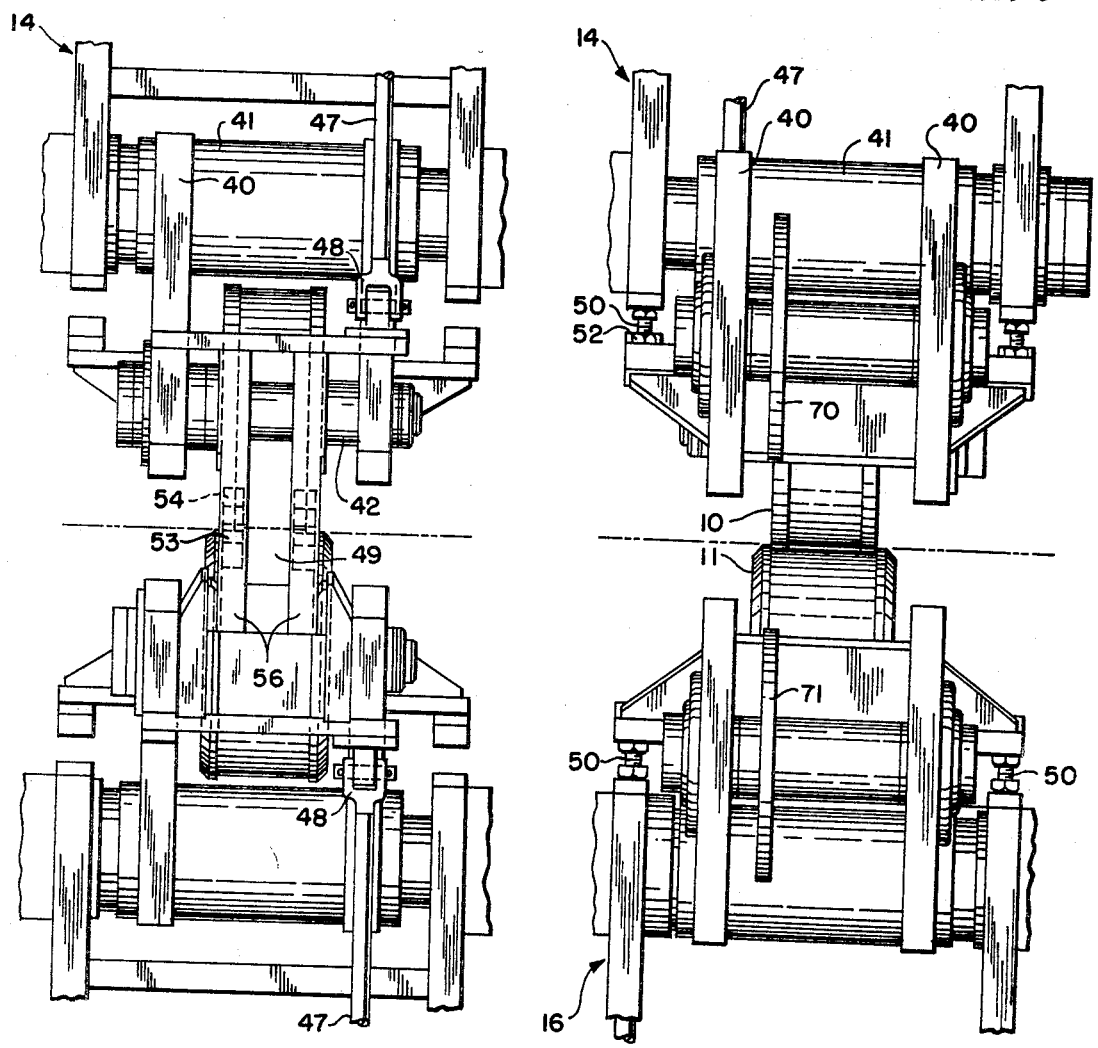

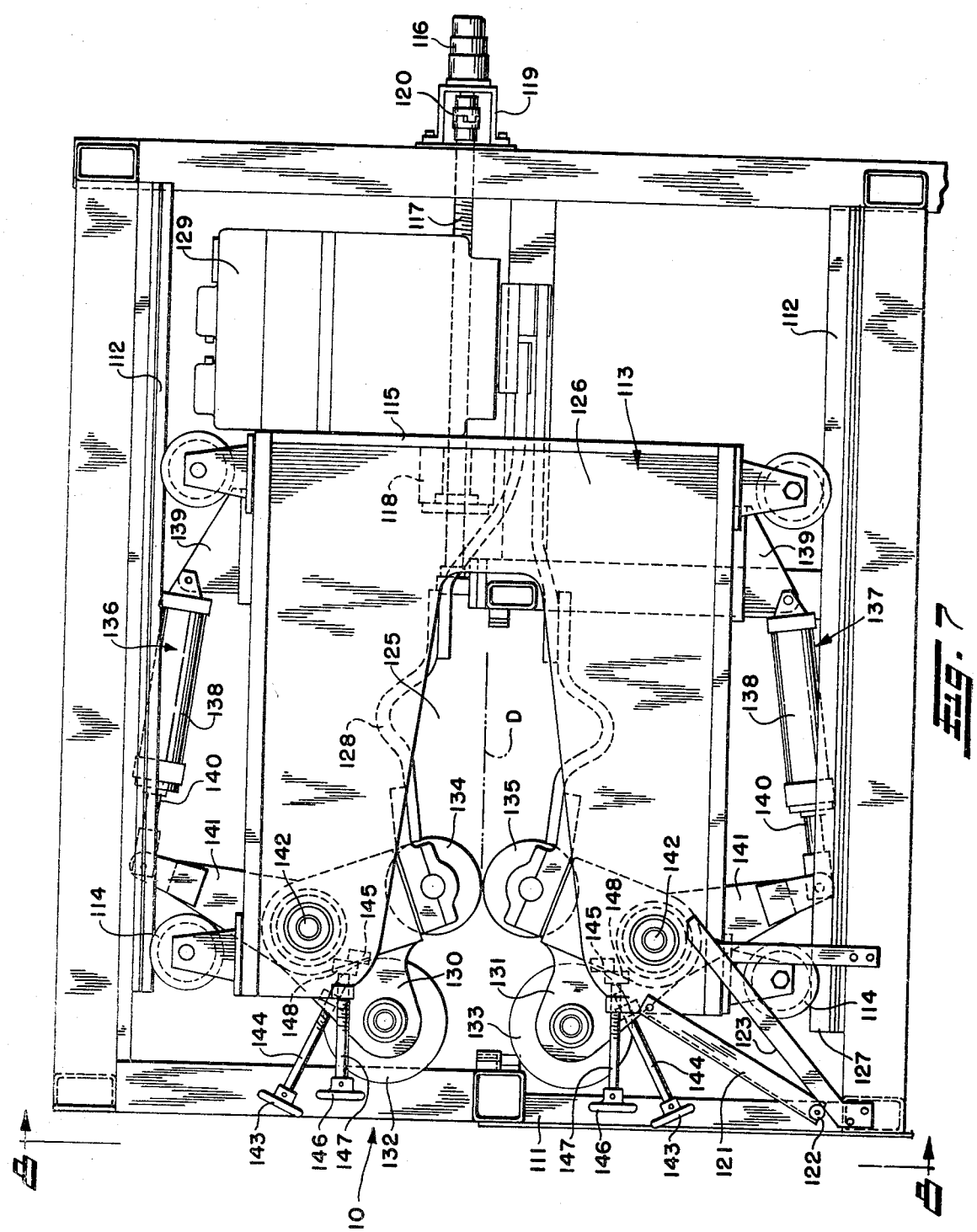

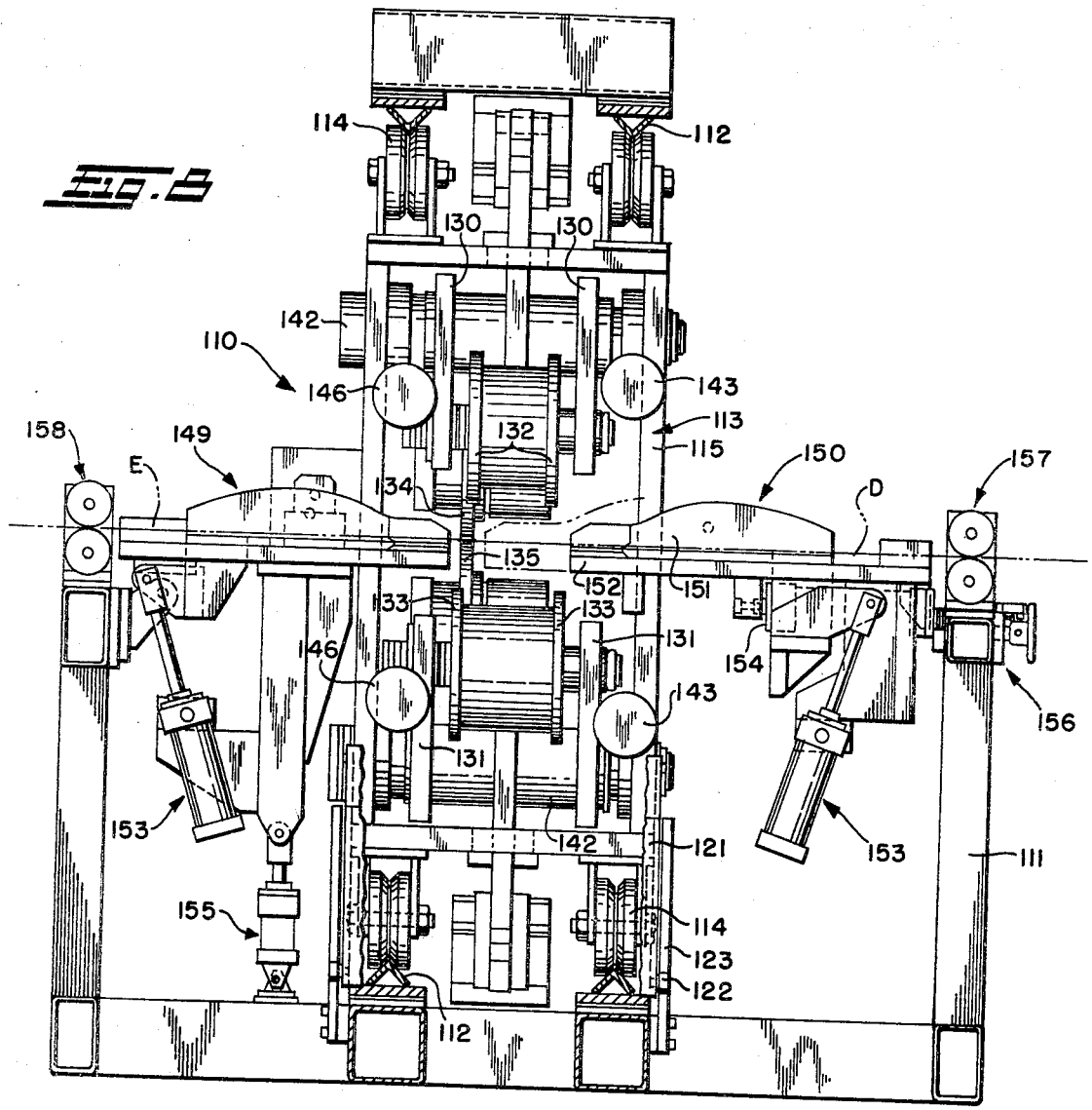

INVENTORS
DONALD J. WHEELER
VICTOR LOHRENZ

BY Oberlin, Maky & Donnelly
ATTORNEYS

United States Patent Office 3,510,625
Patented May 5, 1970

3,510,625
STRIP JOINING METHODS AND APPARATUS
Donald J. Wheeler, Kent, and Victor Lohrenz, Bedford, Ohio, assignors to Guild Metal Joining Equipment Co., Bedford, Ohio, a corporation of Ohio
Filed Mar. 3, 1966, Ser. No. 531,412
Int. Cl. B23k 9/12
U.S. Cl. 219—125                            22 Claims

ABSTRACT OF THE DISCLOSURE

A method and apparatus for joining strip material, such apparatus including a support member pivotally mounted on a carriage for transverse movement across the strip material, such support member having a slitter shear and planish roll or welding apparatus carried thereby for pivotal movement of the slitter shear into strip pass height and retraction of the planish roll or welding assembly and vice versa. A bead trimming tool may also be mounted on the support member adjacent the welding apparatus for removing a part of the weld bead during the welding operation.

---

The present invention relates generally, as indicated, to strip joining methods and apparatus and, more particularly, to methods and apparatus for quickly and easily shearing and joining the ends of metal, plastic, or coated metal strips or the like for continuous processing operations.

In order to be able to process metal or plastic strips continuously, apparatus must be provided for joining the ends of successive strips together in a minimum amount of time, and the resulting joint must be sufficiently strong that it will not break during processing. Moreover, although the joint is generally cut out as scrap during the processing operations, it must still be without surface irregularities that could damage the processing equipment or tools in the processing line, such as reducing or forming rolls, brushes, cut-offs, and blanking, stamping, or other processing equipment.

Oftentimes the leading end of the new strip and trailing end of the processed strip have fish tails or other irregular shapes whereby they are not parallel to each other, which is necessary if the strips are to be quickly joined. Accordingly, it is desirable that the apparatus also include a shear assembly for accurately cutting the ends of the strips parallel to each other prior to joining.

It is therefore a principal object of this invention to provide a relatively simple and inexpensive novel combination strip shearing and joining apparatus, and novel method of using the same.

Another object is to provide a combination shearing and joining apparatus in which both the shearing and joining assemblies are mounted for movement along the same identical path of travel, whereby only one work station is needed for shearing and joining the strip ends together.

Still another object is to provide an apparatus of the type described including a shearing assembly and planish or welding assembly mounted on opposite ends of a centrally pivoted support member, whereby movement of one of the assemblies into position at strip pass height automatically retracts the other assembly and vice versa.

A further object is to provide such an apparatus with a bead trimming tool mounted on the centrally pivoted support member adjacent a weld torch, whereby movement of the weld torch into and out of position will cause a similar movement of the bead trimming tool.

A yet further object is to provide such a combination shearing and welding apparatus with a novel feed roll assembly adjacent its forward end for feeding new strips into the processing line.

Another object is to provide such a combination shearing and welding apparatus with a pivotally mounted back-up bar electrode for supporting the ends of the strips during welding.

Another principal object of this invention is to provide a combination shearing and welding apparatus in which both the upper and lower shearing and welding assemblies are carried at opposite ends of upper and lower pivotally mounted support members, respectively, attached to a single carriage for movement as a unit so as to provide a very compact and inexpensive apparatus in which the shearing and welding assemblies may be moved into and out of their respective operating positions in a minimum amount of time.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

In such annexed drawing:

FIG. 1 is a partial side elevation view of a preferred form of combination strip shearing and joining apparatus in accordance with the present invention without the strip clamp assemblies, processing equipment and feed rolls;

FIG. 2 is a transverse vertical section of the apparatus of FIG. 1 taken on the plane of the line 2—2 thereof, including the strip clamp assemblies, illustrative processing equipment, and feed rolls;

FIG. 3 is an enlarged fragmentary view of part of the upper carriage and one of the carriage guide rails of FIG. 2;

FIG. 5 is a partial end elevation view of the upper and lower carriages of FIG. 4 taken from the left on the plane of the line 5—5 thereof;

FIG. 6 is a partial end elevation view of the upper and lower carriages of FIG. 4 taken from the right on the plane of the line 6—6 thereof;

FIG. 7 is a partial side elevation view similar to FIG. 1, but of another form of combination strip shearing and welding apparatus in accordance with this invention;

FIG. 8 is a left end elevation view of the apparatus of FIG. 7 taken on the plane of the line 8—8 thereof with the strip clamp assemblies and feed rolls added;

Figure 4:
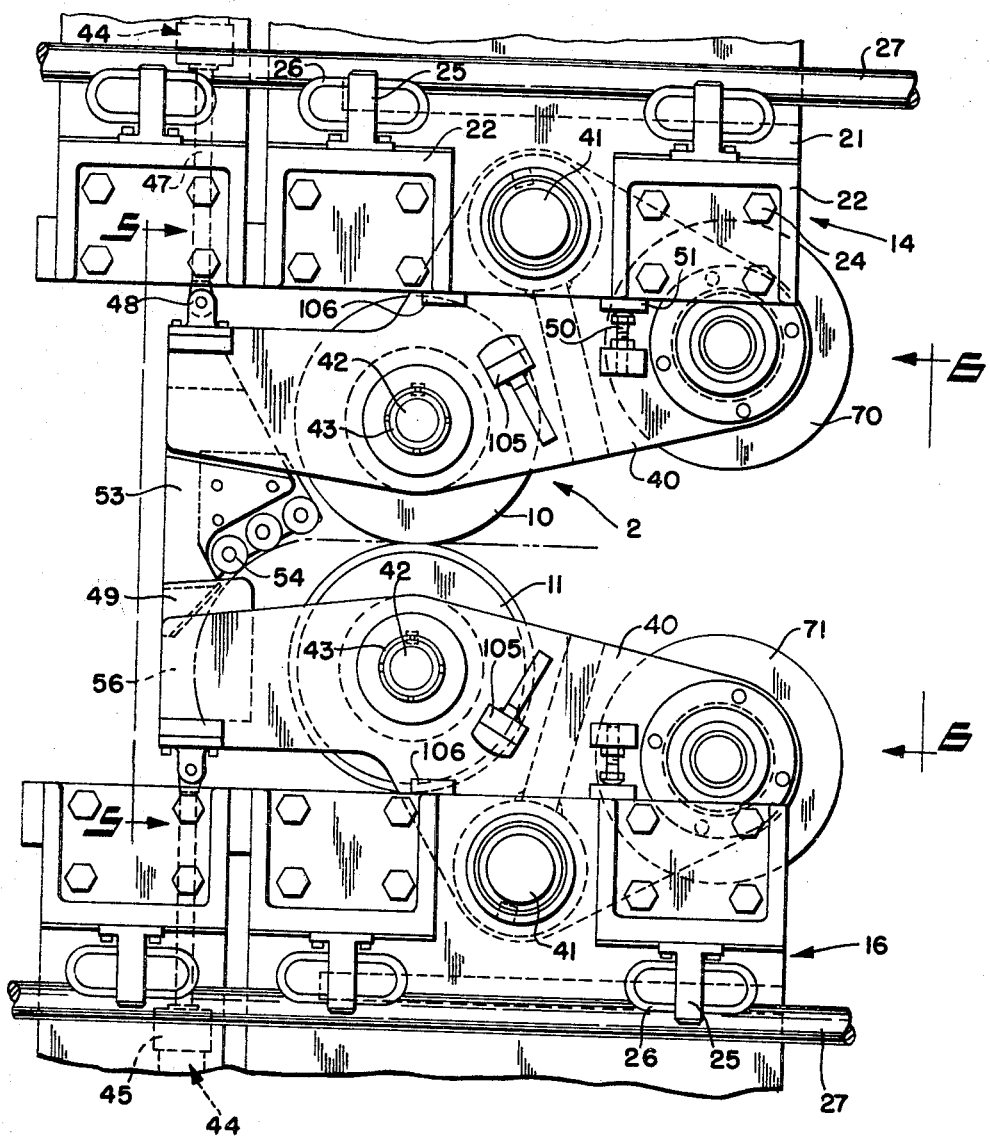
FIG. 4 is an enlarged partial elevation view of the details of the upper and lower carriages of FIG. 1.

Turning now to the details of the preferred form of strip joining apparatus illustrated by way of example in FIGS. 1–6, such apparatus is generally indicated by the numeral 1 and includes a shearing assembly 2 for accurately cutting the ends of the strips A and B parallel to each other and a welding assembly 3 for joining the ends of such strips together subsequent to the shearing operation.

The shearing assembly 2 consists of a pair of upper and lower slitter shear knives 10 and 11 with spacers 12 and 13, respectively, between the knives of each pair. The upper slitter knives 10 are supported by a carriage 14 for movement along a pair of laterally spaced welded I-beam rails 15 or the like transversely across and above the strips A and B to be sheared. The lower slitter knives 11 are likewise supported by a carriage 16 for movement along a pair of rails 17 running parallel to the upper rails 15, but positioned below the strip pass height. Both of such pairs of rails 15 and 17 may be reinforced by strengthening ribs 18 and are supported at their ends by four support stands 19 suitably braced and resting on concrete footings 18 or the like below the floor level 20.

For supporting the upper and lower carriages 14 and 16 on the respective pairs of rails 15 and 17, the carriage side walls 21 are provided with a plurality of bearing support brackets 22 keyed thereto as at 23 and held in position by suitable fasteners 24. As evident from FIG. 3, for example, each support bracket 22 has a V-mounting block 25 with roller chain assembly 26 attached thereto for engagement with elongated rods 27 mounted on the upper and lower edges of the support rails 15 and 17 in any convenient manner, such as by the supports 28 shown.

Driving of the upper and lower carriages 14 and 16 at the same rate of speed to permit the upper and lower slitter knives 10 and 11 to cooperate with each other for shearing the ends of the strips A and B may be accomplished by providing a drive screw 30 for each carriage supported at their ends by pillow blocks 31 and 32 fastened to the adjacent surface of the guide rails 15 and 17. The drive screws 30 threadedly engage a nut 33 fixed to the respective carriages 14 and 16 and are connected together by a connecting rod 34 and suitable couplings 35, whereby a single reversible motor 36 carried by a support bracket 37 at one end of the rails 15 may be used to drive both carriages in either direction.

In actual practice, the rails 15 and 17 and thus the drive screws 30 are usually quite long, up to 16 feet and even more, in which case it is necessary to provide suitable means not shown for supporting the drive screws 30 against sag and vibrations or whipping at high speeds.

Movement of the upper and lower slitter knives 10 and 11 into and out of strip pass height is accomplished in the preferred form shown herein by mounting the slitter knives 10 and 11 between a pair of arms 40 pivoted to both the upper and lower carriages 14 and 16 as at 41, such slitter knives 10 and 11 being carried by arbors 42 supported in bearings 43 in the respective pairs of support arms 40 adjacent one end thereof. Swinging of the slitter knives 10 and 11 about the pivotal connections 41 is effected through actuation of hydraulic piston-cylinder assemblies 44 carried by the upper and lower carriages 14 and 16, the cylinders 45 of which are pivotally mounted on shafts 46 extending between the carriage side walls 20 and the piston rods 47 are pivotally connected to one of the arms 40 of each pair at 48.

For accurately locating the upper slitter knives 10 with respect to the lower slitter knives 11 when the knives are brought together, a guide shoe 49 or the like may project downwardly from between the upper arms 40 for sliding receipt between a pair of guide plates 56 carried by the lower arms 40. Moreover, the clearance between the cutting edges of the slitter knives 10 and 11 in their operative positions is controlled by adjusting screws 50 carried by one of the arms 40 of each pair for engagement with stop pads 51 fixed to the upper and lower carriages 14 and 16. Such adjusting screws 50 permit ready adjustment of the amount of positive or negative clearance between the slitter knives 10 and 11 as required depending on the material and thickness of the strip to be sheared, it only being necessary to loosen the jam nuts 52 and rotate the adjusting screws 50 to the selected position.

A support 53 for supporting a series of rollers 54 adjacent the exit side of the slitter knives 10 and 11 may be carried by the upper arms 40. These rollers 54 are adapted to direct the scrap which is sheared from the strips A and B during the cutting operation toward a scrap cart 55 stationed directly beneath the strips in line with the shearing assembly 2. As shown in FIGS. 1 and 2, the cart 55 may be mounted on rails 58 for permitting ease of positioning of the cart and removal for unloading.

The welding assembly 3 is also shown mounted for movement along the upper rails 15 in the same transverse path across the strips A and B taken by the shearing assembly 2. This eliminates the necessity of having to provide another work station at which the welding operation is performed, and thus of having to align the cut ends of the strips at such another work station, whereby the apparatus 1 is less costly and more compact than similar type prior art apparatus, and saves time.

The welding assembly 3 illustrated in the FIGS. 1–6 embodiment is a torch 60 for arc welding, mounted on a separate carriage 61 and supported on the upper rails 15 in a manner similar to carriage 14. The carriage 61 also has a similar drive system, including a carriage nut 62 engaged by a drive screw 63 supported at its ends by pillow blocks 64 and coupled to a reversible drive motor 65 through a gear reducer, which is necessary since the welding operation is ordinarily performed at a much slower rate than the slitting operation. However, of course a fast return may be provided for both the welding assembly 3 and shearing assembly 2 if desired.

As previously indicated, not only must the welded joint between the two strip ends be of sufficient strength that it will not break during processing, but it must be without irregularities that could damage any of the processing equipment in the line. Accordingly, planish rolls 70 and 71 are usually provided for smoothing the joint subsequent to welding, one such roll being mounted between each pair of carriage arms 40 at the end opposite the slitter knives 10 and 11. Thus, depending on the direction in which the arms 40 are pivoted, either the slitter knives 10 and 11 or planish rolls 70 and 71 will be positioned at strip pass height. This is an important feature, since it eliminates the necessity of providing separate carriages and actuators for the slitter shears and planish rolls, thereby substantially reducing the cost of the apparatus. Moreover, it saves time in positioning the slitter knives 10 and 11 and planish rolls 70 and 71, since when the slitter knives are moved into position the planish rolls are automatically moved out of position and vice versa. However, it should be understood that the planish rolls 70 and 71 could be mounted on separate carriages or eliminated altogether if desired, and the torch 60 could be mounted on the upper arms 40 in place of the upper planish rolls 70, as in the FIGS. 9 and 10 embodiment discussed hereinbelow. Also, other types of welding assemblies 3 may be used instead of the torch 60, such as a seam welding wheel, spot welding electrodes, spot stitch equipment, gas welding apparatus, or flash butt welding apparatus, for example, depending upon the type of weld desired. If electrode wheels are used instead of the torch 60 as in the FIGS. 7 and 8 embodiment, such electrode wheels could be substituted for the planish rolls 70 and 71, and the carriage 61 eliminated, or a planish roll 70 could be mounted on the carriage 61 with a similar carriage and planish roll 71 provided on the lower rails.

The strips A and B are clamped during both the shearing and welding operations by a pair of combination shear and weld clamp assemblies 75 and 76 (see FIG. 2), the clamp assembly 75 being the entry clamp for clamping the new strip B adjacent its leading end; and the clamp assembly 76 being the exit clamp for clamping the processed strip A adjacent its trailing end. Both clamp assemblies 75 and 76 are quite similar in construction, each including a platen 77 suitably supported by the base frame 78 and an elongated clamping beam 79 pivotally mounted on the platen 77 as by means of a bracket 80, whereby upon actuation of the hydraulic piston-cylinder assemblies 81 in opposite directions, the clamping nose 82 of the clamp assemblies 75 and 76 are moved toward and away from the respective platens 77 for clamping and releasing the strips A and B. The cylinder 85 of the hydraulic piston-cylinder assemblies 81 is pivotally mounted on the base frame 78 at 86 while the piston rod 87 is pivotally connected to the outer end of the elongated clamping beam 79 at 88.

About the only difference between the two clamp assemblies 75 and 76 is that a piston-cylinder assembly 90 is also carried by the platen 77 of the entry clamp assembly 75 to permit horizontal indexing of the same, whereby the location of the leading end of the new strip B may be adjusted with respect to the trailing end of strip A; i.e. in overlapping relation thereto, abutting the same, or slightly spaced therefrom, depending on the particular type of weld desired. Stop means, not shown, may be provided for accurately locating the various positions of the entry clamp assembly 75.

During processing of the strip A, the exit and entry clamp assemblies 75 and 76 are normally open to permit unobstructed movement of the strip between the clamping beams 79 and platens 77 to the various processing stations 90 and 91 in the line, such as reducing or forming rolls, brushes, cut-offs, and blanking, stamping, or other processing equipment. The strip A is advanced by a pair of drive rolls 92 located at the far end 93 of the apparatus 1.

As the strip A nears its end, the operator or an automatic device, not shown, determines the length of scrap to be cut therefrom, at which point the strip is stopped and the exit clamp assembly 76 is actuated to secure the strip in place. Next a new strip B is fed from an uncoiler, not shown, into the apparatus 1 by a feed roll assembly 94 located adjacent the near end of the apparatus and, as with the old strip A, when the length of scrap to be cut therefrom is determined, the strip B is stopped and the entry clamp assembly 75 is brought into clamping engagement with the strip.

The feed roll assembly 94 consists of a pair of vertically spaced feed rolls 95 mounted on a slide 96 for vertical movement upon actuation of the piston-cylinder assembly 97 from a first position where at the upper feed roll 95 is at strip pass height to a second position whereat the lower feed roll 95 is at strip pass height. Between the upper and lower feed rolls 95 there is a third feed roll 98 which, upon actuation of a second piston-cylinder assembly 99 carried by the slide 96 and having its piston rod 100 attached to the arbor 101 of the feed roll 98, may be moved into position cooperating with one or the other of the feed rolls 95 for driving a strip B therethrough.

Initially, the upper feed roll 95 is at strip pass height with the intermediate feed roll 98 in contact therewith for driving the strip B in the direction of the clamp assembly 75. When both of the strips A and B are properly clamped, the upper and lower slitter shears 11 are positioned at strip pass height and the shear assembly carriages 14 and 16 are caused to travel across the strips from front to rear or reverse, cutting scrap material from the strips and depositing the same on the scrap cart 55. Suitable stop means may be provided to limit the extent of shear carriage travel in both directions.

Upon completion of the shear stroke, the slitter shears 10 and 11 are retracted from the path line height so as to automatically move the planish rolls 70 and 71 into position. Proper location of the planish rolls 70 and 71 with respect to each other is assured by engagement of the stops 105 on the arm 40 with the stop pads 106 on the carriages 14. Now the entry clamp assembly 75 is indexed a predetermined distance to provide the desired gap or butt joint between the leading and trailing ends of the strips A and B, and a pivotally mounted weld back-up bar 107 is swung into position, pressing the strip ends against the clamping noses 82 of the clamp assemblies 75 and 76 to flatten the strip ends prior to joining. The weld back-up bar 107 also of course acts as the lower weld electrode during the welding operation, which is performed next by actuating the welding carriage 61 to cause the torch 60 to traverse the strips at the joint and weld the strips together. A stop 102 may be provided for limiting the extent of travel of the weld carriage 61. As previously indicated, such weld torch may be of the tungsten inert gas type, metal inert gas, plasma arc, or tungsten inert gas with cold filler wire, for example.

As an alternative to the back-up bar 107, a copper wheel could be provided for traveling against the underside of the strip, always directly below the weld torch 60 during its movement. Or the lower weld electrode could be eliminated altogether and an additional weld torch 60 could be mounted on a lower carriage similar to carriage 61 for welding the joint from both the top and bottom sides of the strip.

After completion of the weld stroke, the welding torch 60 is raised from strip pass height and the weld back-up bar 107 is caused to swing out of position, whereupon the weld torch 60 is returned to the near end of the apparatus, followed by the planish rolls 70 and 71 which smooth out the welded joint. Then both the entry and exit clamp assemblies 75 and 76 are opened to free the strips and the entry clamp assembly 75 is indexed to its original position. So also, the planish rolls 70 and 71 are retracted to bring the slitter knives 10 and 11 into position at strip pass height.

Now the various strip processing operations may be continued until the end of the new strip B is reached. During such continued processing, it is desirable that the intermediate feed roll 98 of the feed roll assembly 93 be moved away from the upper feed roll 95 so as not to interfere with pulling of the strip by the drive rolls 92. As shown in phantom lines in FIG. 2, the intermediate feed roll 98 is brought into engagement with the lower feed roll 95 to permit the leading end of a second new strip C to be positioned therebetween for advancement to the entry clamp assembly 75 upon completion of the processing of strip B. Accordingly, as soon as the trailing end of strip B clears the feed roll assembly 93, the piston-cylinder assembly 97 may be actuated to raise the slide 96 into engagement with a stop rod to bring the intermediate and lower feed rolls 98 and 95, respectively, to pass strip height for prompt feeding of the new strip C to the entry clamp assembly 75, whereupon the clamping, shearing, welding and planishing operations as previously described, or any combination of such operations may be performed.

As mentioned earlier, the apparatus 1 could also be used for mash seam welding simply by providing upper and lower copper mash seam electrode wheels, preferably mounted on the carriage arms 40 in place of the planish rollers 70 and 71 and eliminating the planish rollers altogether, or if it is desired to planish the joint subsequent to the welding operation, mounting the planish rollers on separate carriages, one above and one below the strips. However, a more simplified and compact combination shearing and welding apparatus 110 for both shearing and mash seam welding together the ends of strips of approximately ten inches in width is illustrated in FIGS. 7 and 8. Such apparatus 110 includes a main frame 111 for supporting two sets of vertically spaced guide rails 112 for guiding the movements of a carriage 113 therealong, such carriage having four hardened steel grooved wheels 114 mounted on both the upper and lower surfaces of the carriage housing 115 and engaging the rails 112.

Movement of the carriage 113 along the rails 112 in opposite directions is effected by means of a reversible drive motor 116 and drive screw 117 threadedly engaging a stationary drive nut 118 on the carriage housing 115. The drive motor 116 is attached to the main frame 111 by a mounting bracket 119 and is connected to the drive screw 117 by a suitable coupling 120.

The housing 115 is of generally C-shape and has aligned V-shaped slots 125 formed in the side walls 126 through which strips D and E may pass unobstructed when the carriage 113 is located at the near end 127 of the rails 112 as shown in FIG. 7. Pivotally mounted between the side walls 126 adjacent the entrance to the slots 125 there are a pair of upper and lower bell crank arms 130 and 131 for supporting upper and lower slitter shear blades 132 and 133 at one end, similar to the FIGS. 1–6 embodiment. Also carried by the bell crank arms 130 and 131 at the other end are upper and lower copper mash seam electrode wheels 134 and 135.

Movement of the slitter shear blades 132, 133 and welding electrodes 134, 135 into and out of strip pass height is effected by actuation of upper and lower piston-cylinder assemblies 136 and 137, such piston-cylinder assemblies each including a cylinder 138 pivotally connected to support brackets 139 on the upper and lower surfaces of the carriage 115, and piston rods 140 pivotally connected to levers 141 extending from arbors 142 to which the bell crank arms 130 and 131 are keyed. Positioning of the slitter shear blades 132, 133 at strip pass height may be adjusted by the turning of knobs 143 attached to adjustable stop screws 144 carried by the arms 130, 131 for engagement with stop pads 145 on the side walls 126. Likewise, positioning of the welding electrodes 134, 135 may be adjusted by turning of knobs 146 attached to adjustable stop screws 147 supported by the side walls 126 for engagement with stop pads 148 carried by the arms 130, 131.

The entry and exit clamp assemblies 149 and 150 which clamp the strips D and E during both the shearing and welding operations are quite similar in construction and operation to the clamp assemblies 75 and 76 previously described, each including an elongated clamping beam 151 mounted for pivotal movement toward and away from a platen 152 upon actuation of a piston-cylinder assembly 153.

However, the exit clamp assembly 150, rather than the entry clamp assembly 149, is preferably mounted for horizontal indexing upon actuation of an indexing cylinder 154. Moreover, suitable means including the piston-cylinder assembly 155 is provided for raising and lowering the entire entry clamp assembly 149 to facilitate overlapping of the strip ends D and E which is necessary for mash seam welding, and an overlap control mechanism 156 may be provided to control the amount of overlap desired.

During processing of the trip D, the carriage 113 is in the FIG. 7 position with the clamp assemblies 149 and 150 open to permit advancement of the strip through the apparatus 110 by the drive rolls 157 to various stations down the line whereat operations are performed thereon. When the trailing end of the strip D is reached, however, the strip is stopped and clamped by the exit clamp assembly 150, and the new strip E is fed into the apparatus by the feed rolls 158 and likewise clamped by the entry clamp assembly 149. Then the hydraulic piston-cylinder assemblies 136 and 137 are actuated to bring the slitter shear blades 132 and 133 to strip pass height, thus automatically retracting the welding electrodes 134 and 135, and the carriage 113 is moved across the strips to shear scrap material therefrom. The scrap falls onto a chute 121 pivotally attached to the carriage side walls 126 adjacent the lower slitter shear blades 133 for movement with the carriage, and having rollers 122 thereon which ride on guides 123 fixed to the main frame 111.

Next the slitter shear blades 132 and 133 are retracted to bring the electrode wheels 134 and 135 to strip pass height, and the exit clamp assembly 150 is indexed a predetermined distance to overlap the leading and trailing ends of the strips D and E, respectively, as shown in phantom lines in FIG. 8. Now the carriage 113 is caused to traverse the strips in the reverse direction, whereby the electrode wheels 134 and 135 weld the strips together under pressure in a continuous operation. Current is supplied to the electrode wheels 134, 135 through lead wires 128 from a transformer 129, which may also be mounted on the carriage 113 if desired.

Upon completion of the welding operation, the clamp assemblies 149 and 150 are opened to free the strip and the exit clamp assembly 150 is indexed to its original position. Finally, the electrode wheels 134 and 135 are retracted to bring the slitter shear knives 132 and 133 to strip pass height, thus resetting the apparatus for the nex shearing and welding cycle.

Figure 9:
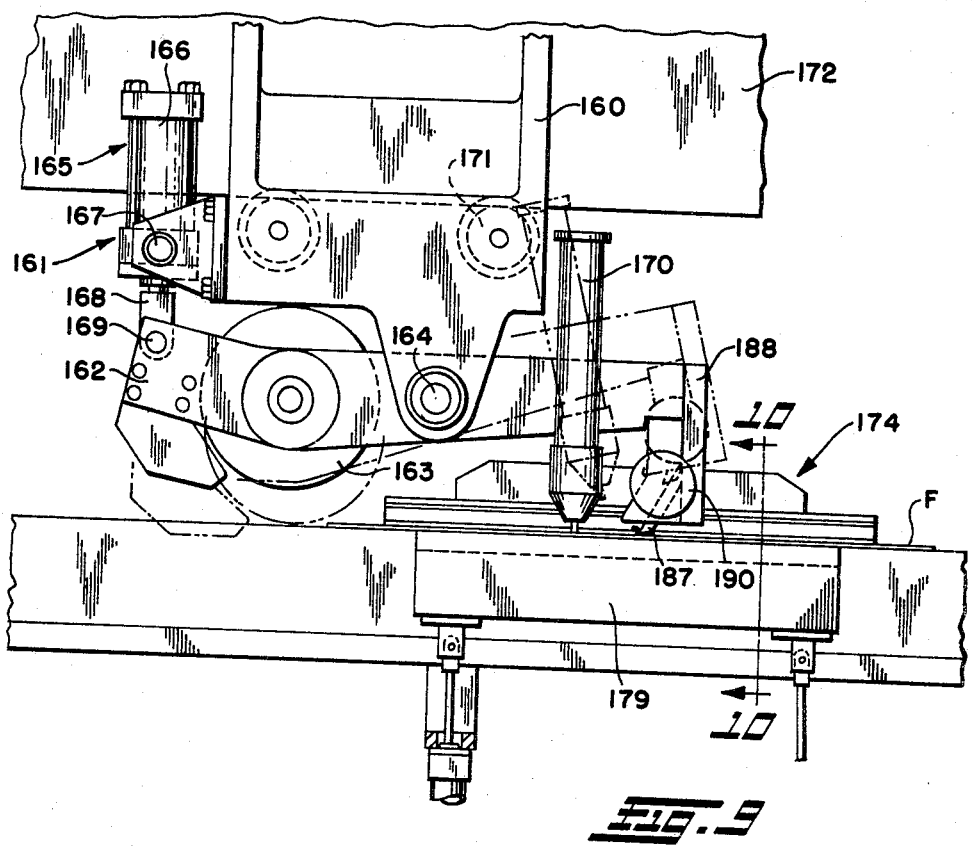
FIG. 9 is a partial side elevation view of yet another form of combination strip shearing and welding apparatus.
Figure 10:
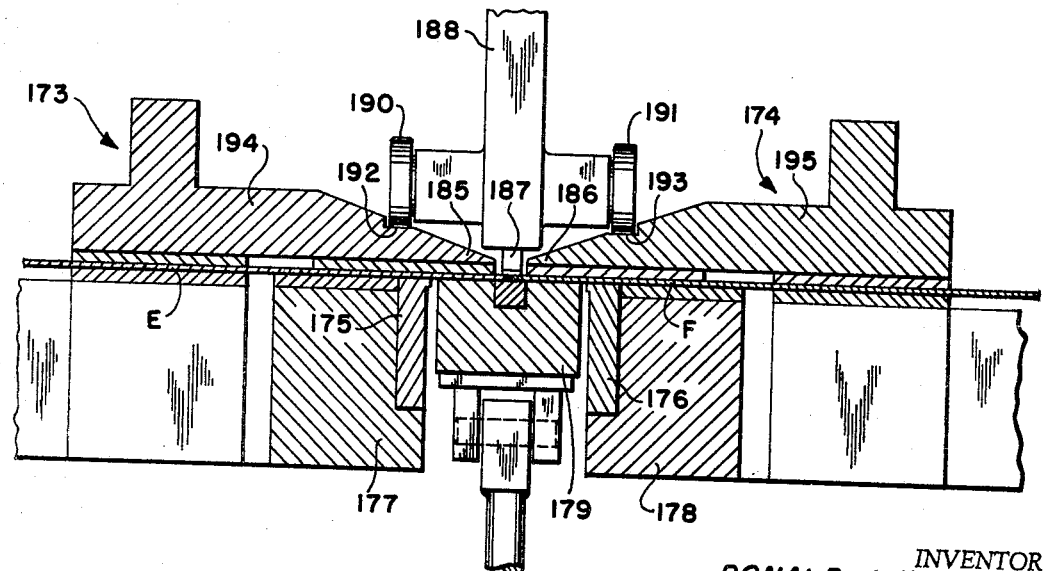
FIG. 10 is a transverse vertical section taken on the plane of the line 10—10 of FIG. 9.

Referring next to the FIGS. 9 and 10 embodiment, the carriage 160 of the combination strip shearing and welding apparatus 161 shown therein likewise pivotally supports a pair of arms 162 between the ends thereof, similar to the FIGS. 1 and 7 embodiments. Also as in the FIGS. 1 and 7 embodiments, there is a pair of rotary slitter knives 163 mounted between one of the ends of the arms 162 for raising and lowering about the pivot 164 upon actuation of a hydraulic piston-cylinder assembly 165, the cylinder 166 of which is pivoted at 167 to the carriage 160 and the rod 168 of which is connected to the arms 162 at 169. The other ends of the arms 162, on the other hand, support a welding torch 170 of any well-known type, whereby when the piston-cylinder assembly 165 is actuated to raise the rotary slitter knives 163 out of strip line height, the welding torch 170 is lowered into position, and vice versa.

The carriage 160 is supported by a plurality of hardened steel wheels 171 which engage a heavy welded beam rail 172 or the like for transverse movement back and forth across a pair of strips E and F, during which the strips are first sheared and then welded while firmly clamped in position by a pair of strip clamp assemblies 173 and 174, shown schematically herein. The strip clamp assemblies 173 and 174, which may be of a type like the clamp assemblies 75 and 76 discussed above, clamp the strips E and F with the ends thereof projecting beyond a pair of stationary shear knives 175 and 176 supported by a pair of stationary shear block assemblies 177 and 178 which cooperate with the rotary slitter knives 163 to shear the strip ends parallel to each other during the shearing operation. There is also a weld back-up bar 179 which is adapted to be raised into position between the stationary shear blades 175 and 176 for firmly pressing the ends of the strips against the clamping noses 185 and 186 during the welding operation.

As the strip ends are welded together, a bead is formed at the weld joint which if not removed may interfere with certain forming operations in the line, such as punching or die forming, and could damage the forming equipment. One way of solving this problem is to use planish rolls such as indicated at 70 and 71 in the FIG. 1 embodiment for smoothing the joint subsequent to welding. Another way illustrated in the FIGS. 9 and 10 embodiment is to provide a bead trimming or cutting tool 187 for removing the upper bead portion of the welded joint, whereby the finished weld is flush and level with the top surfaces of the strips. As shown, the holder 188 for the cutting tool 187 may be attached to the arms 162 adjacent the welding torch 170 so that the cutting tool will automatically be raised out of and lowered into position along with the welding torch, thus eliminating the necessity of having to independently locate the cutting tool. However, it should be understood that the bead cutting tool 187 could be mounted on the carriage 160 for actuation separate from the welding torch 170, or even mounted on its own carriage if desired.

For locating the cutting tool 187 with respect to the upper surfaces of the strips E and F, there is a pair of rollers 190 and 191 mounted on the tool holder 188 for engagement with machined surfaces 192 and 193 on the clamping beams 194 and 194. Since these machined surfaces 192 and 193 are always a fixed distance from the top surfaces of the metal strips when engaged by the clamping beams 194 and 195, the cutting tool 187 is likewise at a fixed distance from such top surfaces with the rollers 190 and 191 contacting such machined surfaces 192 and 193 as aforesaid.

In operation, when the strips E and F are properly clamped, the rotary slitter knives 163 are lowered into the phantom line position shown in FIG. 9, thus automatically retracting the welding torch 170 and cutting tool 187, and the carriage 160 is caused to travel across the strips E and F from front to rear or reverse, during which the rotary slitter knives 163 cooperate with the stationary shear knives 175 and 176 to cut scrap material from the strips. Next the rotary slitter knives 163 are retracted from strip line height and the welding torch 170 and cutting tool 187 are automatically moved into position. Then one or the other of the clamp assemblies 173 and 174 is indexed a predetermined distance to provide the desired gap between the strip ends and the weld back-up bar 179 is raised into position, after which the carriage 160 is moved in the reverse direction to effect welding of the joint and removal of the upper bead portion, whereby the finished weld is flush and level with the upper surfaces of the strips. During such welding and bead removal, the weld back-up bar 179, in addition to acting as the lower electrode, also counteracts the downward pressure on the strips which is applied by the cutting tool.

Although a simple cutting tool 187 is shown, it should be understood that other types of metal removal tools such as milling cutters or multi-cutting tools and the like may be mounted on the tool holder 188 especially in cases where there is excessive buildup of weld material which needs to be removed from the welded joint.

All of the various forms of strip shearing and joining apparatus described hereinabove incorporate a welding apparatus of one type or other for joining strip ends subsequent to shearing. However, rollers could be provided which merely apply a squeezing force for forming a mechanical joint between such strip ends, rather than a weld joint, if desired.

As is now apparent, the methods and apparatus disclosed herein are especially suitable for quickly and easily shearing and joining strip material for continuous processing operations. The mounting of the shearing assembly and planish or welding assembly on the same support for pivotal movement into and out of their respective operating positions greatly reduces the operating time, and also reduces the complexity and cost of the apparatus. Moreover, novel means is provided for feeding new strips to the apparatus, and there is a unique back-up bar which is pivoted into and out of operating position. Further, novel means is provided for disposing of the scrap material which is cut from the strips during the shearing operation.

Finally, the provision of machined surfaces on the strip clamps for guiding the movement of a bead removal tool is a very simple and yet effective means for accurately locating the bead removal tool with respect to the upper surfaces of the welded strips despite variations in the thicknesses thereof.

Other modes of applying the principles of the invention may be employed, change being made as regards the details described, provided the features stated in any of the following claims or the equivalent of such be employed.

We therefore, particularly point out and distinctly claim as our invention:

1. In an apparatus for joining strip material, a frame, clamping means carried by said frame for clamping two strips in a shearing position, a carriage, means mounting said carriage for transverse movement across one side of such strips at such shearing position, a support member pivotally mounted to said carriage between the ends of said support member, slitter shear knife means attached to one end of said support member, a planish roll attached to the other end of said support member, and means for pivoting said support member to bring said slitter shear knife means into strip pass height and automatically retract said planish roll and vice versa.

2. The apparatus of claim 1 further comprising a second carriage, means mounting said second carriage for transverse movement across the other side of such strips at such shearing station, a second support member pivotally mounted to said second carriage between the ends of said second support member, second slitter shear knife means attached to one end of said second support member and adapted to cooperate with said first-mentioned slitter shear knife means to shear the strips therebetween, a second planish roll attached to the other end of said second support member adapted to cooperate with said first-mentioned planish roll to smooth out the joints subsequent to joining, and further means for pivoting said second support member to bring said second slitter shear knife means into strip pass height and automatically retract said second planish roll and vice versa.

3. The apparatus of claim 1 wherein said carriage is of generally C-shape to provide an opening through which such strips are adapted to extend, and there are a pair of support members pivotally mounted to said carriage on opposite sides of said opening, slitter shear knife means attached to one end of each support member, a planish roll attached to the other end of each support member, and means for pivoting said support members to bring said slitter shear knife means into strip pass height and automatically retract said planish rolls and vice versa.

4. The apparatus of claim 1 further comprising a feed roll assembly located adjacent the entrance to said apparatus for feeding new strips into said apparatus comprising a slide on which there is mounted a pair of vertically spaced feed rolls for movement into and out of strip pass height, one being above and the other below strip pass height, an intermediate feed roll located between said pair of feed rolls, and means for moving said intermediate feed roll into and out of engagement with one or the other of said pair of feed rolls, whereby a new strip may be fed by one or the other of said pair of feed rolls and said intermediate feed roll depending on the position of said intermediate feed roll.

5. The apparatus of claim 1 further comprising adjustable stop means for adjusting the position of said slitter shear knife means at strip pass height.

6. The apparatus of claim 1 further comprising a plurality of rollers carried by said support member adjacent the exit side of said slitter shear knife means for directing the scrap sheared from such strips.

7. The apparatus of claim 1 further comprising a second carriage on which there is mounted a welding assembly, means for mounting said second carriage for transverse movement across the sheared ends of such strips, and means for horizontally indexing one of such strips with respect to the other.

8. The apparatus of claim 7 further comprising a weld back-up bar, and means mounting said weld back-up bar for swinging movement in line with said welding assembly into and out of engagement with such strips.

9. An apparatus for joining strip material comprising a frame, clamping means carried by said frame for clamping two strips in a shearing position, a carriage, means mounting said carriage for transverse movement across one side of such strips at such shearing position, a support member pivotally mounted to said carriage between the ends of said support member, slitter shear knife means attached to one end of said support member, strip joining means attached to the other end of said support member and means for pivoting said support member to bring said slitter shear knife means into strip pass height and automatically retract said strip joining means and vice versa.

10. The apparatus of claim 9 wherein said carriage is of generally C-shape to provide an opening through which such strips are adapted to extend, and there are a pair of support members pivotally mounted to said carriage, one on each side of strip pass height, slitter shear knife means attached to one end of each support member, strip joining means attached to the other end of each support member, and means for pivoting said support members to bring said slitter shear knife means into strip pass height and automatically retract said strip joining means and vice versa.

11. The apparatus of claim 10 further comprising a scrap chute pivotally attached to said carriage adjacent the lower slitter shear knife means for movement with said carriage, said scrap chute having rollers mounted on its free end which ride on downwardly sloping guides fixed to said frame.

12. The apparatus of claim 10 wherein there are a pair of clamping means, one for clamping each strip, and one of said clamping means includes means for horizontally indexing said one clamping means to adjust the relative positions of such strips with respect to each other, and the other of said clamping means includes means for raising and lowering said other clamping means to facilitate overlapping of the strip ends for joining.

13. A method of joining the ends of two strips together comprising the steps of clamping the strips at a shearing position in line with a carriage means on which there is pivotally mounted a pair of support members, one on each side of such strips, each support member having slitter shear knife means attached to one end and a planish roll attached to the other end, pivoting such support members to bring such slitter shear knife means into strip pass height and retract such planish rolls, moving such slitter shear means transversely across such strips to shear the same, indexing one of such strips with respect to the other strip, moving a welding assembly transversely across the ends of such strips to weld such strips together, pivoting such support members in the opposite direction to bring such planish rolls into strip pass height and retract such slitter shear knife means, and moving such planish rolls back across such strips to smooth the welded joint between such strips.

14. The method of claim 13 further comprising the steps of swinging a weld back-up bar into engagement with the ends of such strips subsequent to the indexing step and prior to welding, then welding such strips together, and swinging such weld back-up bar out of engagement with such strips prior to the planishing step.

15. An apparatus for joining metal strip material comprising a frame, clamping means carried by said frame for clamping two strips in a shearing position, a pair of stationary shear knives located at such shear position, a carriage, means mounting said carriage for transverse movement across such strips at said shearing station, slitter shear knives supported by said carriage for movement into a position cooperating with said stationary shear knives to shear such strips during such transverse movement, a welding torch also supported by said carriage for welding the ends of such strips together during a second transverse movement, and bead trimming tool means mounted for movement with said welding torch to remove a portion of the bead of the welded joint.

16. The apparatus of claim 15 wherein there is a support member pivotally mounted to said carriage between the ends of said support member, said slitted shear knives being attached to one end of said support member and said welding torch and bead trimming tools means being attached to the other end of said support member, whereby when said slitter shear knives are moved into strip pass height, said welding torch and bead trimming tool means will automatically move out of strip pass height and vice versa.

17. The apparatus of claim 15 wherein said clamping means includes a pair of laterally spaced strip clamping beams mounted on said frame for movement into and out of engagement with such strips, said clamping beams having outer machined surfaces, and said bead trimming tool means comprises a cutting tool attached to said carriage and a pair of roller means attached to said cutting tool for engagement with said machined surfaces when said cutting tool is moved into strip pass height to locate said cutting tool with respect to the upper surfaces of such strips and guide said cutting tool across such strips.

18. In an apparatus for joining strip material, a frame, clamping means carried by said frame for clamping two strips in a shearing position, means for shearing such strips at such shearing position, and a feed roll assembly adjacent the entrance to said apparatus for feeding new strips into said apparatus comprising a slide on which is mounted a pair of vertically spaced feed rolls for movement into and out of strip pass height, one being above and the other below strip pass height, an intermediate feed roll located between said pair of feed rolls, and means for selectively moving said intermediate feed roll into an out of engagement with one of said pair of feed rolls, whereby a new strip may be fed by one of said pair of feed rolls and said intermediate feed roll depending on the position of said intermediate feed roll.

19. The apparatus of claim 1 wherein the pivotal axis for said support member is parallel to the longitudinal axis of the strip material at such shearing position.

20. The apparatus of claim 9 wherein the pivotal axis for said support member is parallel to the longitudinal axis of the strip material at such shearing position.

21. An apparatus for joining metal strip material comprising a frame, clamping means carried by said frame for clamping two strips in a shearing position, a carriage, means mounting said carriage for transverse movement across such strips at such shearing position, a support member, slitter shear knife means carried by said support member, means mounting said support member for pivotal movement to bring said slitter shear knife means into and out of position for shearing such strips during such transverse movement, a welding assembly also supported by said support member for pivotal movement into and out of position for welding the ends of such strips together during a second transverse movement, and bead trimming tool means mounted on said support member adjacent said welding assembly for removing a portion of the weld bead during such second transverse movement.

22. The apparatus of claim 21 wherein said clamping means have outer machined surfaces and said bead trimming tool is supported by a pair of rollers which engage said machined surfaces when said bead trimming tool is moved into strip pass height to locate said bead trimming tool with respect to the upper surface of the strips and guide the bead trimming tool across the strips.

References Cited

UNITED STATES PATENTS

| | | | |
|---|---|---|---|
| 2,600,829 | 6/1952 | Arengo | 29—40 X |
| 3,178,554 | 4/1965 | Cooper et al. | 219—125 |
| 3,198,931 | 8/1965 | Klempay | 228—5 X |
| 3,307,764 | 3/1967 | Robinson | 228—5 |

JOSEPH V. TRUHE, Primary Examiner

C. L. ALBRITTON, Assistant Examiner

U.S. Cl. X.R.

219—82, 83, 117